J. H. Rowe,
Churn.
No. 79,008. Patented June 16, 1868.
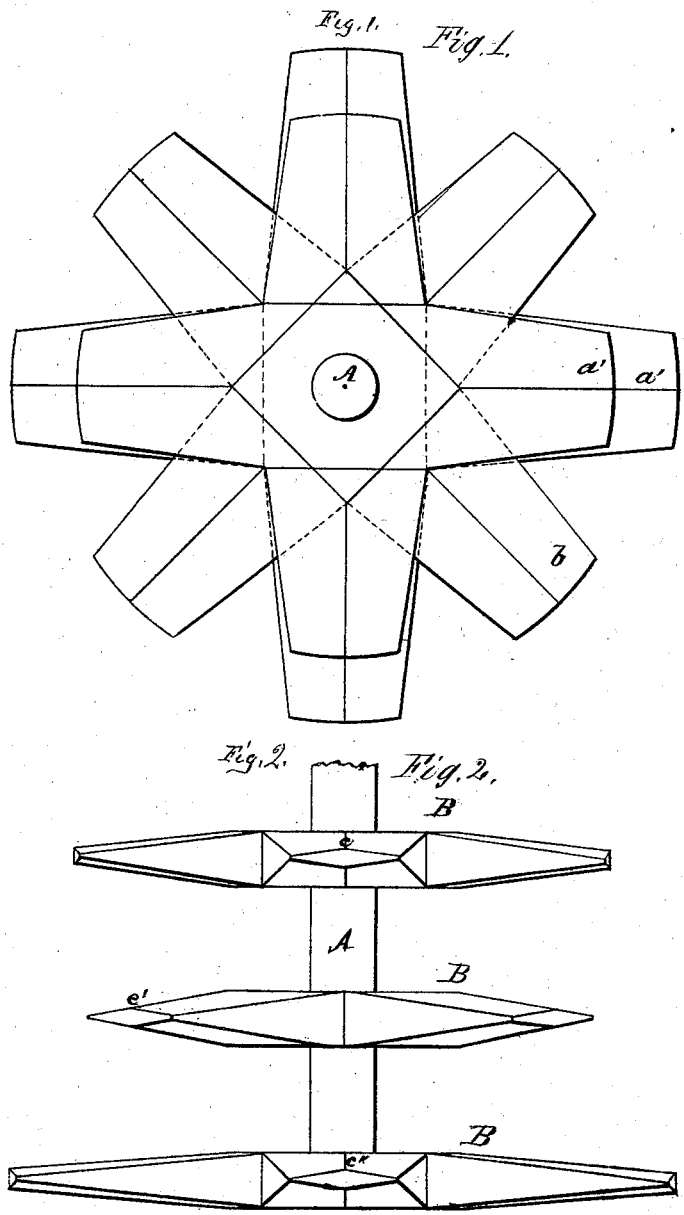
attest
H. F. Willson,
Thomas Prince,
James H. Rowe

United States Patent Office.

JAMES H. ROWE, OF FORT WAYNE, INDIANA.

Letters Patent No. 79,008, dated June 16, 1868; antedated June 6, 1868.

IMPROVEMENT IN CHURN.

*The Schedule referred to in these Letters Patent and making part of the same.*

TO ALL WHOM IT MAY CONCERN:

Be it known that I, JAMES H. ROWE, of Fort Wayne, in the county of Allen, and State of Indiana, have invented certain new and useful Improvements in Churn-Dashers; and I do hereby declare that the following is a full, clear, and exact description thereof, reference being had to the accompanying drawings, and to the letters of reference marked thereon, in which—

Figure 1 is a plan view.
Figure 2 is a side elevation.

The nature of my invention consists in an improved method of constructing churn-dashers. My improvement is in the arrangement of a series of beaters, which are so bevelled and chamfered that in passing through the milk to be agitated, converging and diverging currents are alternately formed in said milk without having the least tendency to throw the milk into a spray, which is at all times injurious to the desired result.

To enable others skilled in the arts to make and use my invention, I will proceed to describe its construction and operation.

A represents the lower portion of the handle of my dasher broken off.

B represents three dashers, which are all constructed in the same form in every respect, but their diameters, however, decrease in a regular ratio from the lower dasher to the upper one, as will be distinctly seen in fig. 1. These dashers are placed at equal distances apart, and are firmly secured in their position in such a manner that the beaters $a'$ $a''$ run exactly parallel to each other, while those of the middle series, marked $b$, stand at an angle of forty-five degrees to the former, as will be readily understood. Each of these dashers is constructed by halving two pieces together, and so chamfering their sides and ends or edges, in the manner seen in fig. 2, a to leave no surface at right angles to the handle of the dasher or that would be horizontal while in use.

Having thus fully described the construction of my invention, I will now give its operation, prefaced, however, by the statement that my object is to produce butter by means of friction rather than excessive agitation, which is fully accomplished by the peculiar formation of the blades.

We will suppose the dasher to be placed in the bottom of a barrel-churn that has a sufficient quantity of milk already prepared for operation. It is clear that should the dasher be elevated suddenly, the effect of the upper surface of the top section would be to break or cut the milk upon the angles of the blades marked $c$, and cause it to slide from its upper surface to the sides thereof, until it met or came in contact with a corresponding current from the next successive blade on each side of the same series. It is plain that owing to the sloping of said blades, both towards their sides and toward their ends, the direction of the conflicting currents must be inclined downward and outward. The result of this movement, then, is to concentrate and unite the two currents, and converge it in its downward course, so as to precipitate on to the angle $c'$ of the middle dasher below it, where it is again separated, and a like series of currents is formed, as before, which is in like manner precipitated on to the angle $c''$ of the lower series, and is thence passed off, as before. A portion of the milk is, however, thrown toward the sides of the churn, and strikes it, and is again reflected off at the same angle toward the centre, where it is intercepted by the lower dasher, as will be readily understood, thus most effectually securing strong and unbroken currents and counter-currents, together with a great amount of friction-surface upon the dashers themselves, which produces the result of bringing the milk to the desired temperature in an incredibly short space of time, and so thoroughly mixes it that the temperature is alike in all parts, thus securing a full yield of butter in an incredibly short space of time.

The construction of this dasher is simple; its operation is complete, it thoroughly washes itself, gathers the butter quickly and perfectly, and can be used in any barrel-churn.

What I claim as new, and desire to secure by Letters Patent, is—

A churn-dasher, constructed in the manner and for the purpose herein specified and described as an article of manufacture.

JAMES H. ROWE.

Witnesses:
H. F. WILLSON,
GEO. ESMOND.